United States Patent
Friis

(10) Patent No.: US 9,316,208 B2
(45) Date of Patent: Apr. 19, 2016

(54) METHOD AND APPARATUS FOR HANDLING WIND TURBINE COMPONENTS DURING TRANSPORT AND ASSEMBLY

(75) Inventor: Jesper Fyhn Friis, Varde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/367,562

(22) PCT Filed: Dec. 22, 2011

(86) PCT No.: PCT/DK2011/050516
§ 371 (c)(1),
(2), (4) Date: Sep. 4, 2014

(87) PCT Pub. No.: WO2013/091632
PCT Pub. Date: Jun. 27, 2013

(65) Prior Publication Data
US 2015/0023790 A1 Jan. 22, 2015

(51) Int. Cl.
| | |
|---|---|
| *B66C 1/00* | (2006.01) |
| *F03D 11/04* | (2006.01) |
| *B66C 1/10* | (2006.01) |
| *F03D 1/00* | (2006.01) |
| *F03D 11/00* | (2006.01) |
| *E02B 17/00* | (2006.01) |

(52) U.S. Cl.
CPC ............... *F03D 11/04* (2013.01); *B66C 1/108* (2013.01); *F03D 1/005* (2013.01); *F03D 11/00* (2013.01); *E02B 2017/006* (2013.01); *E02B 2017/0091* (2013.01); *Y02E 10/726* (2013.01); *Y10T 29/4932* (2015.01)

(58) Field of Classification Search
CPC ......... F03D 11/04; F03D 11/00; F03D 1/005; B66C 1/16; B66C 1/24; B66C 1/10; B66C 13/08; B66C 1/46; B66C 1/108; B65D 90/0033; A47J 45/077; B65G 67/00; Y10T 29/4932; Y02E 10/726; E02B 2017/006; E02B 2017/0091
See application file for complete search history.

(56) References Cited

U.S. PATENT DOCUMENTS

| | | | | |
|---|---|---|---|---|
| 3,253,851 | A * | 5/1966 | Gilbert | 294/119.2 |
| 3,433,459 | A * | 3/1969 | Logan | 254/281 |
| 3,915,311 | A * | 10/1975 | Ball et al. | 414/766 |
| 4,597,602 | A * | 7/1986 | McGriff | 294/81.3 |
| 7,396,058 | B2 * | 7/2008 | Mariani | 294/67.5 |

FOREIGN PATENT DOCUMENTS

| | | |
|---|---|---|
| EP | 2364949 A1 | 9/2011 |
| WO | 2006/076920 A1 | 7/2006 |
| WO | 2011/154110 A1 | 12/2011 |

OTHER PUBLICATIONS

International Searching Authority, International Search Report and Written Opinion issued in corresponding PCT Application No. PCT/DK2011/050516 dated Aug. 30, 2012, 12 pages.

\* cited by examiner

*Primary Examiner* — Stephen Vu
(74) *Attorney, Agent, or Firm* — Wood, Herron & Evans, LLP

(57) ABSTRACT

A method for handling wind turbine sub-assemblies includes coupling a connecting device to a connector of a hoisting device at a first connection interface of the connecting device; coupling a first wind turbine sub-assembly to the connecting device at a second connection interface of the connecting device; moving the first wind turbine sub-assembly with the hoisting device; coupling a second wind turbine sub-assembly different than the first wind turbine sub-assembly to the connection device at a third connection interface of the connecting device; and moving the second wind turbine sub-assembly with the hoisting device. An apparatus for handling wind turbine sub-assemblies is also disclosed.

17 Claims, 9 Drawing Sheets

METHOD AND APPARATUS FOR HANDLING WIND TURBINE COMPONENTS DURING TRANSPORT AND ASSEMBLY

TECHNICAL FIELD

This application relates generally to wind turbines and, more particularly, to a method and apparatus for handling wind turbine components during both transport and assembly using a multi-functional connecting device that allows a crane or other hoisting device to couple to the various wind turbine components.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades (e.g., three blades) mounted thereto and extending radially therefrom.

Modern wind turbines are massive structures and are generally assembled in pieces. In this regard, many off-shore wind turbines have their various components delivered quay side for subsequent delivery to the off-shore installation site. Some installation procedures may call for some amount of assembly quay side resulting in a number of sub-assemblies. For example, the wind turbine tower, which may be formed by a number of tower sections, may be assembled quay side for delivery to an off-shore installation site. The nacelle may also be delivered quay side in a complete or nearly-completed form. Alternatively, some assembly of the nacelle may also be performed quay side resulting in a complete or nearly complete nacelle. Lastly, the blades, themselves being quite massive in size, may be delivered quay side for subsequent delivery to the off-shore installation site.

These various sub-assemblies, e.g., the tower, nacelle, and blades, are then loaded onto a vessel and transported to the installation site for final assembly. In this regard, suitable hoisting devices, such as cranes, winches, hoists, or the like, are located quay side and used to load the wind turbine sub-assemblies on board the vessel. To this end, the hoisting device typically includes a cable arrangement having a hook or other hoisting connector which couples with the wind turbine sub-assemblies for moving the sub-assemblies onto the vessel. However, because of the vast differences in the geometry of the wind turbine sub-assemblies (e.g., shape, size, etc.), the manner in which the sub-assemblies couple to the hook of the hoisting device may differ.

By way of example, to load a wind turbine tower onto a vessel, a tower lifting yoke is coupled to one end of the tower. The tower lifting yoke is a beam-like member which is generally bolted to an end of the assembled tower and includes two eyelets on opposed ends of the beam. Cables then extend from the eyelets to the hook of the hoisting device so that the tower may be lifted by the hoisting device and loaded onto the vessel. As the time and labor involved in coupling a tower lifting yoke to a tower may be appreciable, numerous lifting yokes are kept on hand so that each tower being transported to the installation site may have its own dedicated lifting yoke, thereby expediting the loading process of the towers onto the vessel. Once the towers are loaded onto the vessel, the lifting yokes are not removed, but remain with the towers so as to provide an interface for a hoisting device at the installation site. For example, the tower lifting yoke may be used to interface with an installation site hoisting device to unload the tower or position the tower at the installation site for final assembly.

In regard to the nacelle, another separate device is typically provided that couples to the hook of the hoisting device for loading the nacelle onto the vessel. Thus, after the towers are loaded onto the vessel, for example, the working crew couples a nacelle lifting yoke to the hoisting device. The nacelle lifting yoke is an elongate cylindrical member with trunnions at opposed ends thereof. Cables extend from the trunnions to eyelets on the nacelle. Unlike the tower lifting yoke, however, each nacelle does not have its own dedicated yoke. Instead, a single nacelle lifting yoke may be used to load the nacelles on board the vessel. After the nacelles have been loaded on board the vessel, the nacelle lifting yoke is uncoupled from the hoisting device. The nacelle lifting yoke may be stored either on board the vessel, or stored quay side if, for example, there is another nacelle lifting yoke at the installation site.

To load the blades on board the vessel, yet another device may be used to interface with the hoisting device. For transport of wind turbine blades, frame members are typically coupled to the blades that facilitate their loading and stacking on, for example, the vessel. By way of example, a root frame member and a tip frame member may be coupled to each blade at the quay side, and several frame members stacked on top of each other to form a frame assembly. A relatively large blade lifting yoke is then coupled to the hook of the hoisting device via suitable cables. The blade lifting yoke includes a spreader bar that couples to the frame assembly so that the blades may be lifted by the hoisting device and loaded onto the vessel. Similar to the towers, as the time and labor involved in coupling the frame members to a blade may be appreciable, numerous frame members are kept on hand so that each blade being transported to the installation site may have its own dedicated frame member, and thereby expedite the loading process of the blades onto the vessel. Once the blades are loaded onto the vessel, the frame members are not removed, but remain with the blades to facilitate, for example, stacking of the blades on board the vessel or unloading the blades at the installation site.

With the vessel loaded with the various wind turbine sub-assemblies, the vessel moves to the installation site where the sub-assemblies are finally assembled to form the wind turbine. In this regard, the installation site typically includes a hoisting device, such as a crane, winch, hoist, or the like, having a cable arrangement and hook or other hoisting connector configured to couple with the wind turbine sub-assemblies. Similar to the loading process, due to the vast differences in geometry and the task being performed, the manner in which the sub-assemblies couple to the hook of the installation site hoisting device may differ.

In this regard, and as noted above, the tower lifting yokes used to load the towers remain with the towers during transport such that these lifting yokes may again be used to unload or position the towers for final assembly. Afterward, the hook may be uncoupled from the tower lifting yoke. Once the tower is erected during installation, the lifting yoke may be removed from the tower. The nacelle lifting yoke may then be coupled to the hook of the hoisting device for unloading or positioning the nacelle for final assembly. As noted above, the nacelle lifting yoke may be the one stored on board the vessel or one that was previously located at the installation site. In any event, afterward, the hook may be uncoupled from the nacelle lifting device. Lastly, if the blades are being unloaded at the installation site, the hook of the hoisting device may be coupled to a blade lifting yoke and unloaded from the vessel in a manner similar to that above. Alternatively, if the blades are being assembled to the wind turbine from the vessel, a blade gripping tool may be coupled to the hook of the hoisting device. The blade gripping tool provides a secure coupling to the blade as the blade is being lifted by the hoisting device for assembly to the hub of the wind turbine rotor. After the blades are coupled to the hub, the blade gripping tool may be uncoupled from the hook of the hoisting device.

The process described above, which is typical for many off-shore wind turbine installations, has several drawbacks. For example, each sub-assembly includes its own specific connection device for coupling with the hook or hoisting connector of the hoisting device, i.e., the tower has the tower lifting yoke, the nacelle has the nacelle lifting yoke, and the blades have a blade lifting yoke and blade gripping tool. Attaching and removing the current tower lifting yokes is labor intensive, time consuming, and requires numerous units. Additionally, when transitioning from the loading or assembly of one sub-assembly to another sub-assembly, the hoisting device goes through a part or equipment change out and add on. For example, to load or assemble the nacelle, the nacelle lifting yoke must be coupled to the hook and then de-coupled from the hook upon completion so that, for example, the blades may be unloaded or assembled. These change-out processes are time consuming and present safety considerations for the workers or crew members responsible for loading, unloading, and assembly of the wind turbine sub-assemblies.

Thus, there is a need for an improved method and apparatus for handling wind turbine components during, for example, loading processes, unloading processes, and/or assembly processes that overcome these various drawbacks.

SUMMARY

To address these and other issues, a method for handling wind turbine sub-assemblies includes coupling a connecting device to a connector of a hoisting device at a first connection interface of the connecting device; coupling a first wind turbine sub-assembly to the connecting device at a second connection interface of the connecting device; moving the first wind turbine sub-assembly with the hoisting device; coupling a second wind turbine sub-assembly different than the first wind turbine sub-assembly to the connection device at a third connection interface of the connecting device; and moving the second wind turbine sub-assembly with the hoisting device. One of the second or third connection interfaces includes a movable element movable between a first position and a second position. The connecting device is coupled to the respective first or second sub-assembly when the movable element is in the first position and the connecting device uncoupled from the respective first or second sub-assembly when the movable element is in the second position.

In one embodiment, the first wind turbine sub-assembly includes a nacelle, the connecting device includes trunnions at spaced-apart locations on the connecting device, and the method includes extending cables from the trunnions of the connecting device to connectors on the nacelle; and limiting movement of the cables along the trunnions. The movement of the cables along the trunnions may be limited by locating the cables in channels formed on the trunnions having side walls that bound the cables.

In one embodiment, the second wind turbine sub-assembly includes a tower, the third connection interface includes the movable element, and the method includes positioning the movable element in the second position; positioning the connecting device on an end of the tower; and positioning the movable element in the first position so as to couple the tower to the connecting device. In one embodiment, the movable element may be moved by actuating an actuator coupled thereto. The tower may include an inwardly directed flange adjacent the end of the tower and the method may include positioning the connecting device on the end of the tower such that the movable element is within a periphery defined by the flange and positioned below the flange; and positioning the movable member in the first position by moving the movable element outward of the periphery of the flange so as to be beneath the flange.

In a further aspect of the invention, the method may include coupling a third wind turbine sub-assembly different than the first and second sub-assemblies to the connecting device at a fourth connection interface of the connecting device; and moving the third wind turbine sub-assembly with the hoisting device. The third wind turbine sub-assembly may include a frame assembly carrying a plurality of blades and the method may include coupling the connecting device to the frame assembly using a blade lifting yoke. In this regard, the connecting device may include one or more shackles located thereon, and the method includes coupling a structural member of the blade lifting yoke to the frame assembly; and extending cables from the shackles of the connecting device to the structural member of the blade lifting yoke. The frame assembly may be formed by coupling a root frame member to each blade adjacent a root end of the blade; coupling a tip frame member to each blade adjacent a tip end of the blade; stacking one blade on top of another blade; and coupling adjacent root and tip frame members to form the frame assembly holding the plurality of blades.

In still another aspect of the invention, the method may include coupling a fourth wind turbine sub-assembly different than the first, second, and third sub-assemblies to the connecting device at a fifth connection interface; and moving the fourth wind turbine sub-assembly with the hoisting device. The fourth wind turbine sub-assembly may include a single blade and the method may include coupling the connecting device to the blade using a blade gripping tool. In this regard, the method may further include coupling selectively removable plate members to the blade gripping tool prior to coupling the connecting device thereto. The fifth connection interface may be the same as the third connection interface, the method including positioning the movable element in the second position; positioning the connecting device on a surface of the blade gripping tool; and positioning the movable element in the first position so as to couple the blade gripping tool to the connecting device.

In a further embodiment, a method for handling wind turbine sub-assemblies includes coupling a connecting device to a connector of a hoisting device at a first connection interface of the connecting device; coupling a first wind turbine sub-assembly to the connecting device at a second connection interface of the connecting device; moving the first wind turbine sub-assembly with the hoisting device; coupling a second wind turbine sub-assembly different than the first wind turbine sub-assembly to the connection device at a third connection interface of the connecting device different than the second connection interface; and moving the second wind turbine sub-assembly with the hoisting device.

In yet another embodiment, an apparatus for handling wind turbine sub-assemblies includes an elongate main body member; a first connection interface coupled to the main body member and configured for coupling the apparatus to a connector of a hoisting device; a second connection interface coupled to the main body member and configured for coupling the apparatus to a first wind turbine sub-assembly; and a third connection interface different than the second connection interface and configured for coupling the apparatus to a second wind turbine sub-assembly different than the first wind turbine sub-assembly.

In one embodiment, the first wind turbine sub-assembly includes a nacelle and the second connection interface includes trunnions at opposed ends of the main body member. Moreover, the second wind turbine sub-assembly may include a tower and the third connection interface includes a movable element movable between a first position, wherein the apparatus is coupled to the tower, and a second position, wherein the apparatus is uncoupled from the tower. In another aspect, the apparatus may include a fourth connection interface different than the second and third connection interfaces coupled to the main body member and configured for coupling the apparatus to a third wind turbine sub-assembly different than the first and second wind turbine sub-assemblies. The third wind turbine sub-assembly may include a frame assembly carrying a plurality of blades and the fourth connection interface includes at least one shackle.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
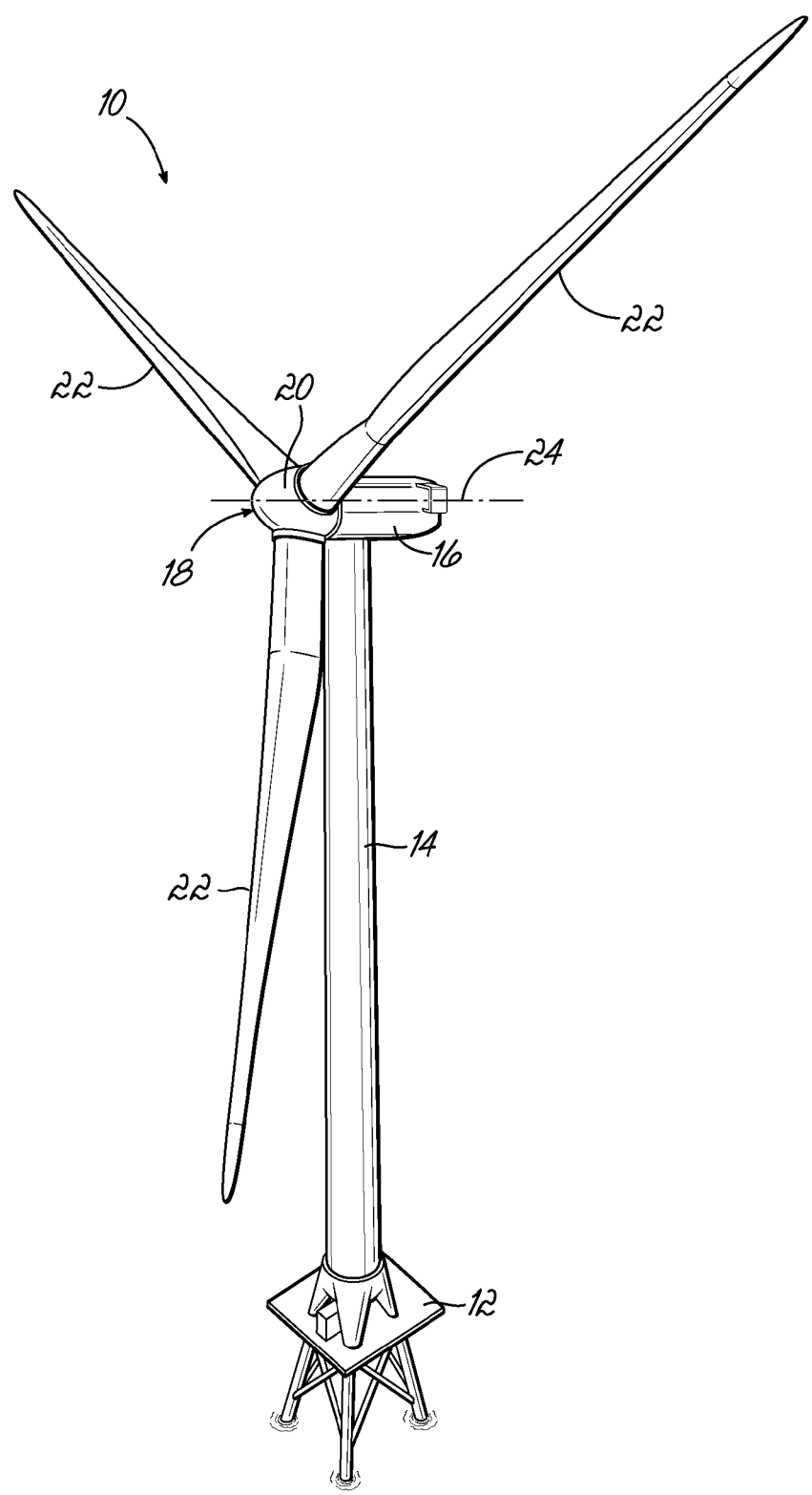
FIG. 1 is a diagrammatic perspective view of an off-shore wind turbine.

With reference to FIG. 1, an off-shore wind turbine 10 includes a foundation 12 which extends into the water, a tower 14 coupled to the foundation 12 at a lower end thereof, a nacelle 16 disposed at the apex of the tower 14, and a rotor 18 operatively coupled to a generator (not shown) housed inside the nacelle 16. The foundation 12 may be a floating foundation, or alternatively supported by the sea bed beneath the water line. In addition to the generator, the nacelle 16 houses miscellaneous components required for converting wind energy into electrical energy and various components needed to operate, control, and optimize the performance of the wind turbine 10. The tower 14 supports the load presented by the nacelle 16, the rotor 18, and other components of the wind turbine 10 that are housed inside the nacelle 16 and also operates to elevate the nacelle 16 and rotor 18 to a height above sea level at which faster moving air currents of lower turbulence are typically found. While an off-shore wind turbine 10 is illustrated in FIG. 1, it should be recognized that aspects of the present invention may also be used for on-shore wind turbine installations as well.

The rotor 18 of the wind turbine 10, which is represented as a horizontal-axis wind turbine, serves as the prime mover for the electromechanical system. Wind exceeding a minimum level will activate the rotor 18 and cause rotation in a plane substantially perpendicular to the wind direction. The rotor 18 of wind turbine 10 includes a central hub 20 and at least one blade 22 that projects outwardly from the central hub 20 at locations circumferentially distributed thereabout. In the representative embodiment, the rotor 18 includes three blades 22, but the number may vary. The blades 22 are configured to interact with the passing air flow to produce lift that causes the rotor 18 to spin generally about a longitudinal axis 24.

The wind turbine 10 may be included among a collection of similar wind turbines belonging to an off-shore wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
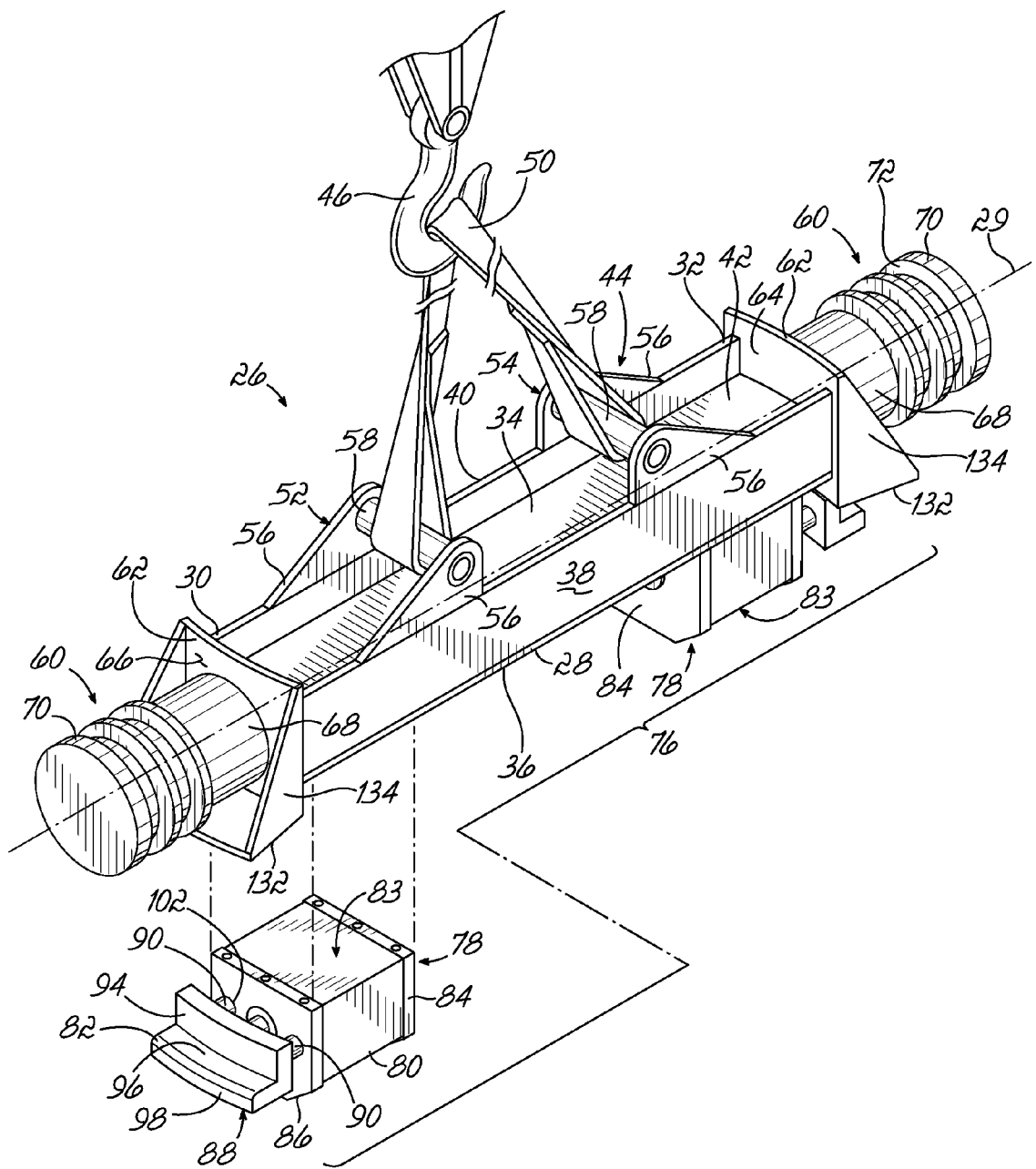
FIG. 2 is a partially disassembled perspective view of a connecting device in accordance with an embodiment of the invention.

As noted above, the construction of off-shore wind turbines often requires the transport of wind turbine components or sub-assemblies to the installation site using a sea-faring vessel. The wind turbine components or sub-assemblies are loaded onto the vessel using a hoisting device, such as a crane, winch, hoist, or similar devices. The wind turbine components or sub-assemblies may also be unloaded from the vessel and/or positioned for assembly using a hoisting device as well. In accordance with an embodiment of the invention, FIG. 2 illustrates a multi-functional connecting device, generally illustrated at 26, that allows the various wind turbine components or sub-assemblies to couple to the hoisting device in a manner that overcomes many of the deficiencies of the existing apparatus and methodologies, as outlined above.

As illustrated in this figure, the multi-functional connecting device 26 includes an elongate main body member 28 that extends along a longitudinal axis 29 and having a first end 30, a second opposed end 32, an upper side 34 and a lower side 36. The main body member 28 may be formed from structural material including steel or other suitable metals or materials and may have a beam-like configuration. In this regard, and in one embodiment, the main body member 28 may have an I-beam configuration with opposed flanges 38, 40 coupled by an intermediate web 42. This embodiment, however, is merely exemplary and other configurations are possible. For example, the main body member 28 may be configured as a generally solid or hollow circular body, a generally solid or hollow rectangular or square body, or a body having other geometrical forms. Therefore, the invention is not limited to the particular I-beam configuration shown herein.

Figure 4:
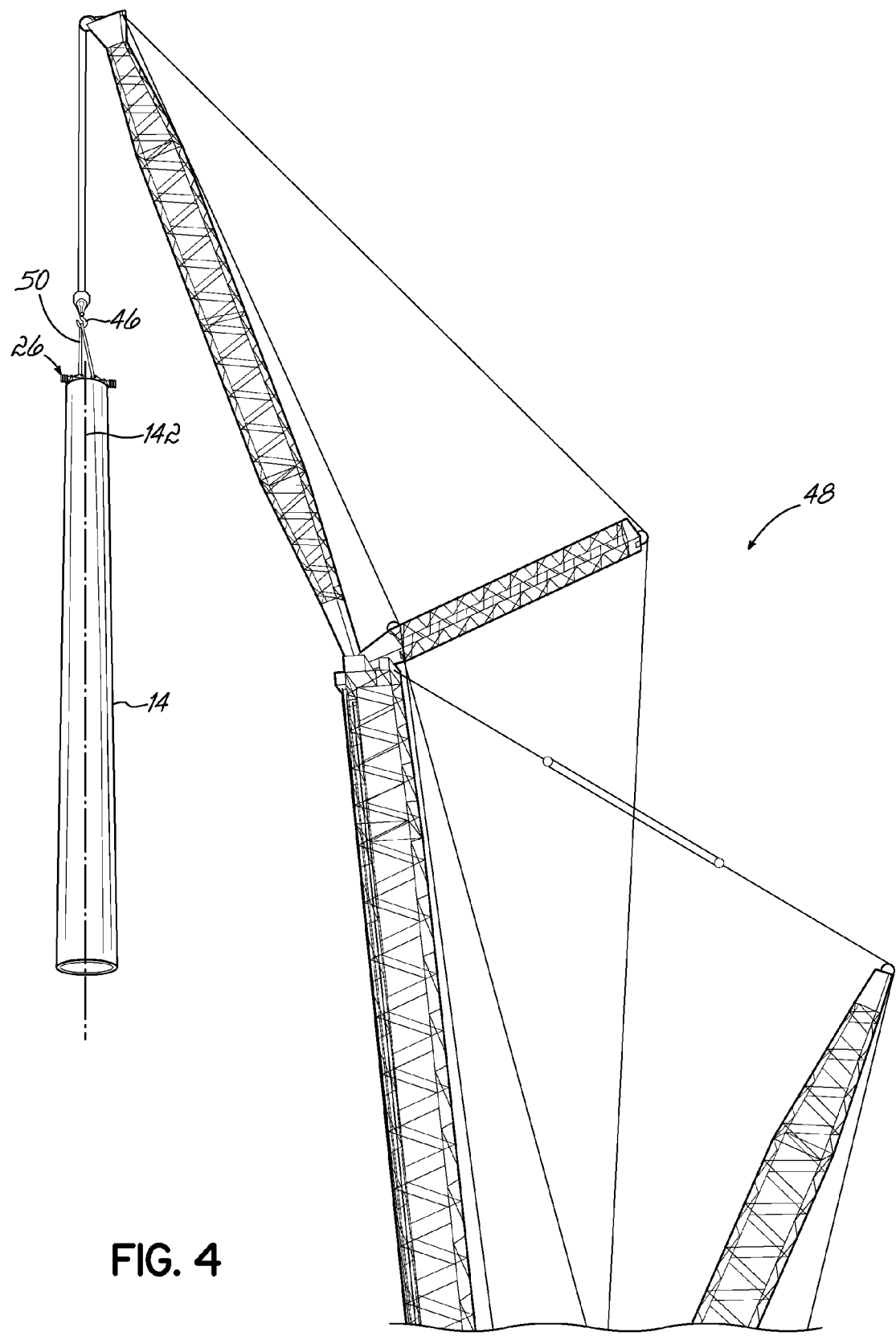
FIG. 4 illustrates an exemplary use of the connecting device of FIGS. 2 and 3 with a hoisting device and a tower.

The upper side 34 of the multi-functional connecting device 26 includes a first connection interface, generally shown at 44, configured to couple the connecting device 26 to the hook 46 or hoisting connector of a hoisting device 48, such as through suitable cables 50 or the like, as shown in FIG. 4. As used herein, the term cable/cables encompass a broad range of rigging hardware including not only elongate members (e.g., metal stands or the like), but also various slings, such as cable slings, web slings, etc. In an exemplary embodiment, the first connection interface 44 includes a pair of ears 52, 54 coupled to the main body member 28. Each ear 52, 54 includes a pair of spaced apart support plates 56 and a support pin 58 extending therebetween. In one embodiment, the support plates 56 have a generally triangular configuration and extend from an upper surface of the flanges 38, 40. However, it should be recognized that other configurations are possible. The cables 50 are configured to couple to the support pins 58. The support plates and pins 56, 58 may also be formed of steel or other materials suitable for accommodating the loads thereon. Moreover, while two ears 52, 54 are shown, more or less ears (i.e., connection points) may be provided and arranged relative to, for example, the connecting device's center of gravity to achieve a balanced and workable configuration.

In an advantageous aspect of the invention, the multi-functional connecting device 26 includes a second connection interface, generally shown at 60, adjacent the first and second ends 30, 32 of main body member 28. The second connection interface 60 may be configured to couple to one or more of the wind turbine components or sub-assemblies. For example, and as will be discussed in more detail below, the second connection interface 60 may be configured to couple to the nacelle 16 of the wind turbine 10. In one embodiment, the second connection interface 60 includes an end plate 62 at each of the first and second ends 30, 32 having an inwardly-facing surface 64 which couples to the end of the main body member 28 and an outwardly-facing surface 66. Generally cylindrical trunnions 68 extend outwardly from each of the end plates 62 and include a plurality of generally annular guide plates 70 that define bounded grooves or channels 72. As discussed in more detail below, the bounded grooves 72 are configured to receive cables (FIG. 7) that extend to the nacelle 16 in a manner that limits the travel (e.g., due to sliding, for example) of the cables along the trunnions 68. The end plates 62, trunnions 68 and guide plates 70 may be formed from steel or other suitable structural materials and may, for example, be coupled by a welding process, bolting, or other suitable manner.

In accordance with an embodiment of the invention, the multi-functional connecting device 26 includes yet a further third connection interface, generally shown at 76, on the lower side 36 of the main body member 28 and adjacent the first and second ends 30, 32. The third connection interface 76 may be configured to couple to one or more wind turbine components or sub-assemblies. For example, and as will be discussed in more detail below, the third connection interface 76 may be configured to couple to the tower 14 of the wind turbine 10. In one embodiment, and unlike the other connection interfaces, the third connection interface 76 may include a movable element that facilitates engagement and/or disengagement from a wind turbine component or sub-assembly.

In this regard, the third connection interface 76 includes a pair of retraction units 78 adjacent the first and second ends 30, 32 and extending downwardly from the lower side 36 of the main body member 28. As best illustrated in FIG. 2, the retraction units 78 include a fixed portion 80 that fixedly couples to the main body member 28 and provides the structural aspects to the third connection interface 76, and a movable portion 82 movable relative to the fixed portion 80 and configured to selectively couple and uncouple the connecting device 26 from a wind turbine component or sub-assembly.

In one embodiment, the fixed portion 80 includes a housing 83 having a backer plate 84 extending downwardly from the main body member 28 and fixedly secured thereto, such as through bolts, welding or other suitable connection techniques. The housing 83 may further include a bearing block 86 also coupled to the main body member 28 and extending downwardly therefrom. Although the backer plate 84 and the bearing block 86 are shown as two separate components, it should be recognized that the housing 83 may be a single monolithic body that provides the structural integrity of the retraction unit 78. It should be further recognized that other arrangements of the housing 83, such as more than two separate components, are also possible. The housing 83 may be formed from steel or other suitable materials.

The movable portion 82 of the retraction units 78 includes a movable bearing plate 88 and at least one, and preferably two guide rods 90 coupled to the bearing plate 88 at one end thereof and configured to guide the movement of the bearing plate 88 between, for example, a first, extended position and a second, retracted position, as will be explained in more detail below. The bearing plate 88 is configured to engage the wind turbine component or sub-assembly, and in one embodiment, has an L-shaped configuration with a base portion 94 and a lip portion 96 protruding therefrom in, for example, a substantially perpendicular manner. Other angles and other configurations are also possible depending on the particular application. The lip portion 96 may include an outer edge 98 having a chamfer to facilitate coupling of the bearing plate 88 with the wind turbine component or sub-assembly. In one embodiment, the outer edge 98 may be slightly arcuate to generally correspond to the curvature of the tower 14 to which the bearing plate 88 will be coupled, as explained below. The base portion 94 may be slightly arcuate as well to generally correspond to the curvature of the tower 14 (such as the flange thereof, as explained below).

The ends of the guide rods 90 may be coupled to an inner surface 100 of the base portion 94 and extend in a direction generally opposite to the lip portion 96. The bearing block 86 of housing 83 includes one or more bores 102 (the number generally corresponding to the number of guide rods 90) configured to slidably receive and support the guide rods 90 therein. The guide rods 90 and bores 102 may, in one embodiment, have a generally cylindrical cross-sectional shape, although other configurations are possible. Additionally, the bearing plate 88 and guide rods 90 may be formed from steel or other suitable material for sustaining the loads thereon.

Figure 6A:
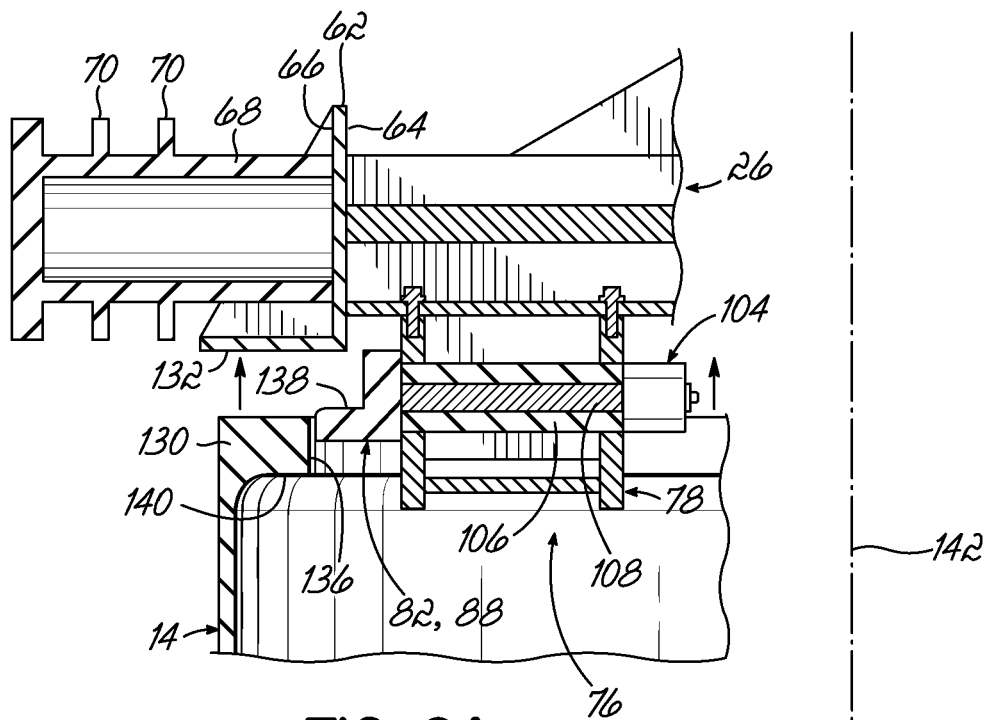
FIG. 6A is a partial cross-sectional view of the connecting device and the tower in an uncoupled position.
Figure 6B:
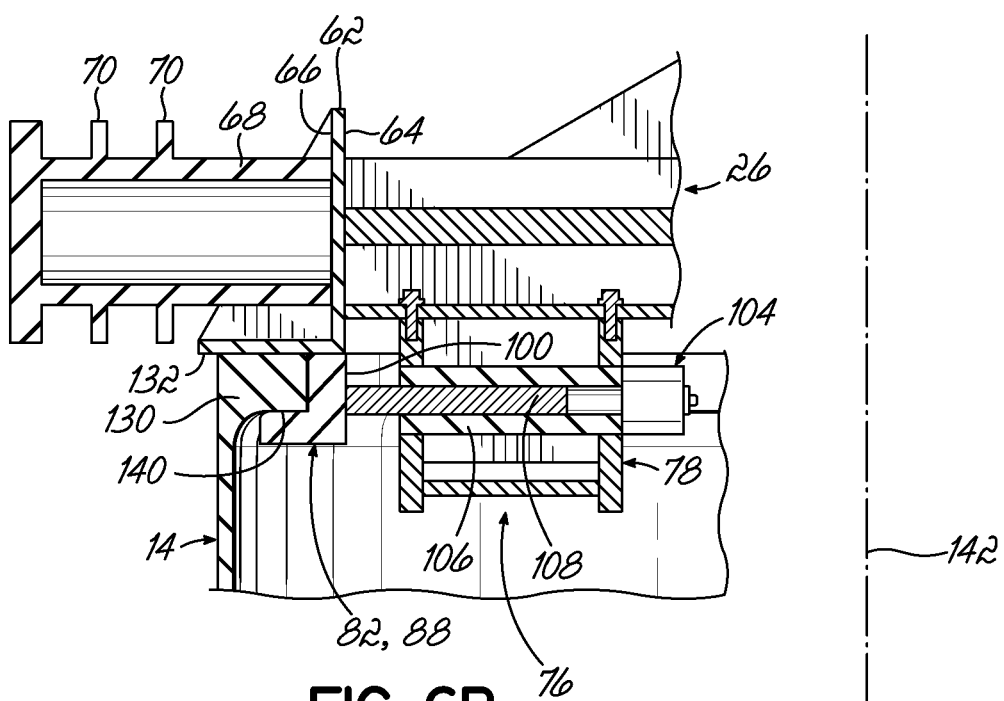
FIG. 6B is a partial cross-sectional view of the connecting device and tower similar to FIG. 6A, but in a coupled position.

The retraction units 78 may further include an actuator 104 for selectively moving the movable portion 82, and the bearing plate 88 more particularly, between the extended and retracted positions. A wide range of actuators may be used in accordance with the invention including, for example and without limitation, hydraulic actuators, pneumatic actuators, electric actuators or other drive actuators known to those of ordinary skill in the art. In an exemplary embodiment, the actuator 104 includes a hydraulic actuator having a cylinder 106 and a rod 108 extendable relative to the cylinder 106 (FIGS. 6A and 6B). In this embodiment, the cylinder 106 may be coupled to the housing 83 of the retraction unit 78. For example, one end of the cylinder 106 may be fixedly coupled to the backer plate 84 through, for example, a welding or other suitable connection. The rod 108 extends from the other end of the cylinder 106 and has an end which may be coupled to the bearing plate 88, such as along the inner surface 100 thereof. In this way, retraction and extension of the rod 108 causes a corresponding movement to the bearing plate 88. In one embodiment, the retraction units 78 may be configured and arranged such that the retraction and extension movement of the bearing plate 88 occurs in a direction generally parallel to the longitudinal axis 29 of the main body member 28. Other arrangements, however, may be possible as well.

Figure 3:
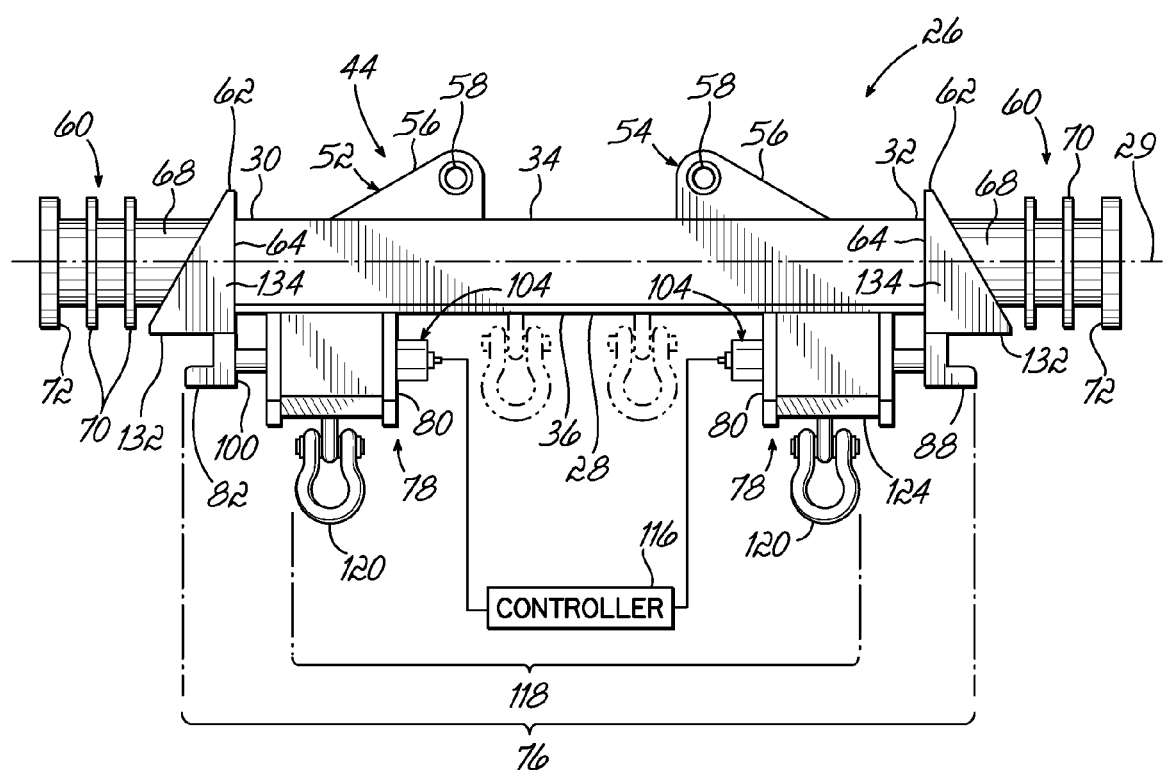
FIG. 3 is a front view of the connecting device shown in FIG. 2.

In one embodiment, the actuators 104 may be operatively coupled to a controller, shown schematically at 116 in FIG. 3, for controlling the actuation of the actuators 104, and thus movement of the bearing plates 88 between the retracted and extended positions. The controller 116 may include at least one processor coupled to a memory, which may represent the random access memory (RAM) devices constituting the main storage of the computer and any cache memories, non-volatile or backup memories (e.g., programmable or flash memories), read-only memories, etc. The controller 116 may also include one or more mass storage devices. The controller 116 also typically receives a number of inputs and outputs for communicating information externally. The interface to the controller 116 may also be directed through an external terminal connected directly or remotely to controller 116. Through the controller 116, the actuation of actuators 104 may be controlled to achieve a desired movement of bearing plates 88. It should be recognized that in an alternate embodiment, the connecting device 26 may include a switch (e.g., manual or otherwise) or other device for controlling the actuation of actuators 104. Additionally, it should be recognized that input to the controller 116 may be through a hard wired connection or achieved wirelessly.

In accordance with an exemplary embodiment of the invention, the multi-functional connecting device 26 may include a fourth connection interface, generally shown at 118 (FIG. 3), which may be configured to couple to one or more wind turbine components or sub-assemblies. For example, as will be discussed below, the fourth connection interface 118 may be configured to couple to a blade lifting yoke for moving wind turbine blades 22. In one embodiment, the fourth connection interface 118 includes one or more shackles 120 or other suitable connectors (rings, hooks, etc.) configured to receive a cable or the like for coupling the connecting device 26 to the blade lifting yoke, as explained below. In one embodiment, the shackles 120 may be coupled to the connecting device 26 at a lower side or surface 124 of the retraction units 78. In an alternative embodiment, however, the shackles 120 may be coupled to the lower side 36 of the main body member 28 (shown in phantom in FIG. 4). The shackles 120 may be spaced apart along the main body member 28, or there may be but a single shackle 120 located generally centrally along the main body member 28 (not shown). The shackles 120 may be formed from steel or other materials suitable for accommodating the loads being imposed thereon.

The method of using the multi-function connecting device 26 to handle a plurality of different wind turbine sub-assemblies will now be described. In this regard, the connecting device 26 may be coupled to the hook 46 or hoisting connector of the hoisting device 48 via the first connection interface 44. More particularly, and by way of example, cables 50 may extend from the hook 46 to the support pins 58 of ears 52, 54 (FIG. 2). Use of the multi-functional connecting device 26 will be described for handling towers 14, then for nacelles 16, and then for blades 22. The particular order of loading or unloading wind turbine components or sub-assemblies onto/from a vessel may vary depending on the type of vessel, for example, or other factors. The order of description as provided herein should not limit the scope of the present invention. Additionally, although the connecting device 26 is described in conjunction with handling towers, nacelles, and blades, it should be recognized that the connecting device may be used with other wind turbine components as well. For example, the connecting device 26 may be used to load, unload, or assemble wind turbine tower sections as well. Thus, the term tower encompasses both substantially complete tower constructions as well as portions of a tower construction, such as tower sections.

Figure 5:
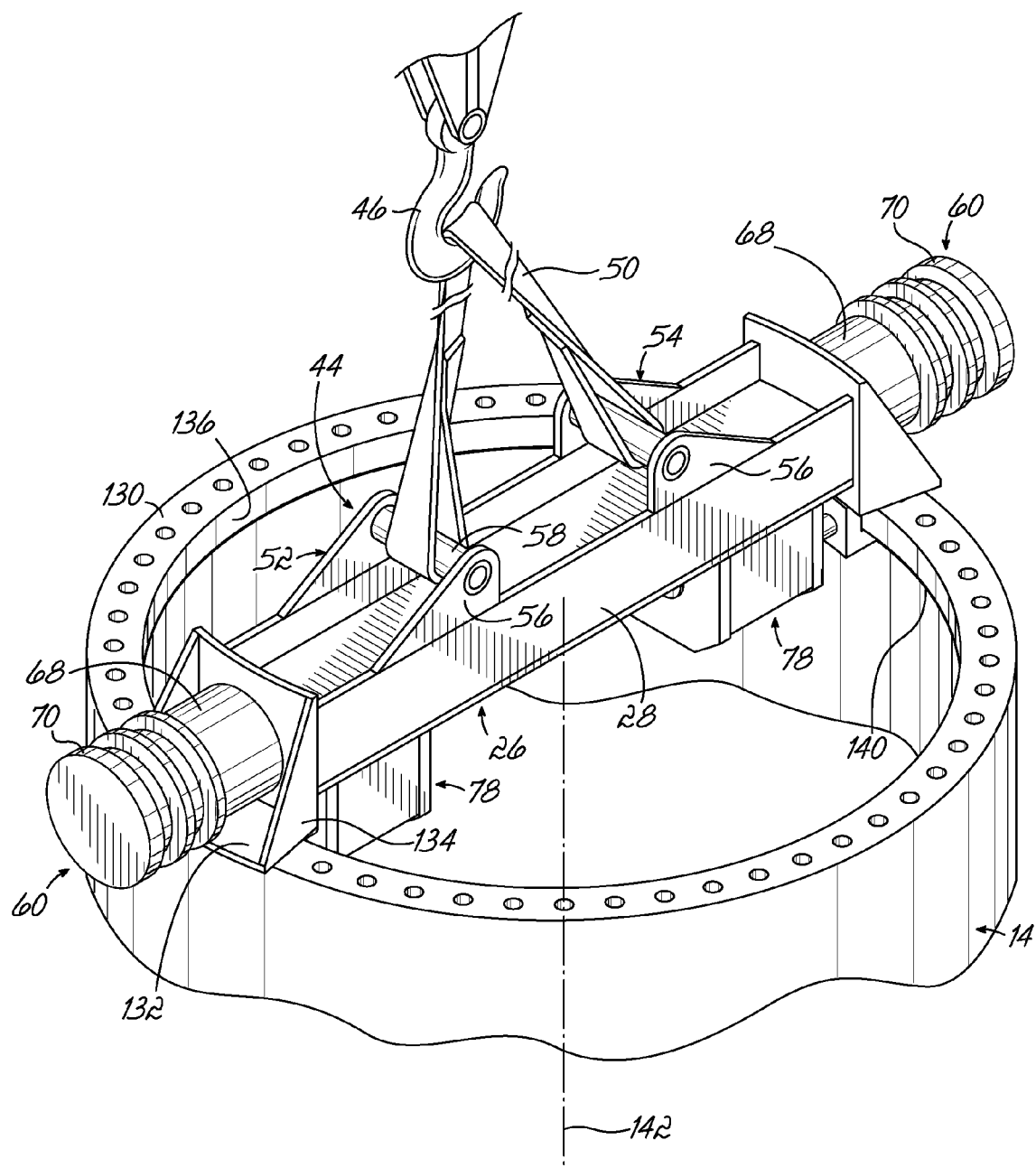
FIG. 5 is a perspective view of the connecting device coupled to a tower.

FIGS. 5-6B best illustrate the use of connecting device 26 for handling towers 14, such as for loading, unloading, and/or assembly purposes. In this regard, the coupling of the connecting device 26 to a tower 14 may be achieved via the third connection interface 76. To this end, an end of the tower 14 generally includes an inwardly-directed flange 130, which may be advantageously used to couple the connecting device 26 to the tower 14. More particularly, the connecting device 26 may be placed on the end of the tower 14 such that the retraction units 78, and more particularly the bearing plates 88 thereof, are generally positioned within a perimeter defined by the tower 14 (FIG. 6A). The connecting device 26 may include abutment surfaces, such as abutment plates 132 to facilitate placement and stabilization of the connecting device 26 on the end of the tower 14. In one embodiment, the abutment plates 132 may extend outwardly from the end plates 62 of the second connecting interface 60. A gusset plate 134 may also be provided to provide strength to the abutment plate 132 and/or end plates 62.

With the actuators 104 in a retracted position, the bearing plates 88 are positioned generally within the perimeter defined by the flange 130, so as to allow the connecting device 26 to be seated on the end of the tower 14 without interference, and have the bearing plates 88 positioned generally below the flange 130. This is best illustrated in FIG. 6A. With the connecting device 26 and bearing plates 88 so positioned, the actuators 104 may be actuated so as to move the bearing plates 88 outwardly to the extended position. This may be done, for example, using the controller 116 or other device for actuating the actuators 104. In the extended position, the base portion 94 may abut the inner edge 136 of the flange 130 and the lip portion 96 may be beneath or underlie the flange 130. Moreover, an upper surface 138 of the bearing plates 88 may engage the underside surface 140 of the flange 130. In this position, the connecting device 26 is essentially locked on to the tower 14 and the connecting device 26 is substantially prevented from moving relative to the tower 14 in at least one direction generally parallel to the main axis 142 of the tower 14, and in a direction generally perpendicular to the main axis 142 of the tower 14. This is best illustrated in FIG. 6B. In this way, a tower 14 may be moved by the hoisting device 48 to achieve the desired purpose, e.g., loading, unloading, or assembly. To uncouple the connecting device 26 from a tower, the actuators 104 may be actuated so as to move the bearing plates 88 back to the retracted position. The connecting device 26 may then be lifted off the end of the tower 14 by the hoisting device 48 so as to load, unload, or assemble another tower 14, for example.

This aspect of the present invention provides certain advantages relative to that described above. For example, the connecting device 26 quickly and conveniently couples to the tower 14 without the time and labor associated with coupling tower yokes to each individual tower. Additionally, only one connecting device 26 has to be used to load, unload, or assemble the tower. This is in contrast to the conventional method described above that uses dedicated tower yokes. A back-up connecting device 26 may optionally be provided, thereby limiting the number of connecting devices to two. In a further advantageous aspect of the invention, the same multi-functional connecting device 26 used to handle towers 14 in the manner described above, for example, may also be used to handle other wind turbine sub-assemblies, such as nacelles 16. In other words, the same connecting device 26 may be used to interface with multiple wind turbine components or sub-assemblies. The ability to use the same connecting device 26 for multiple sub-assemblies reduces or avoids the time, effort and safety concerns associated with multiple change-out procedures used in the current methodologies, such as that described above.

Figure 7:
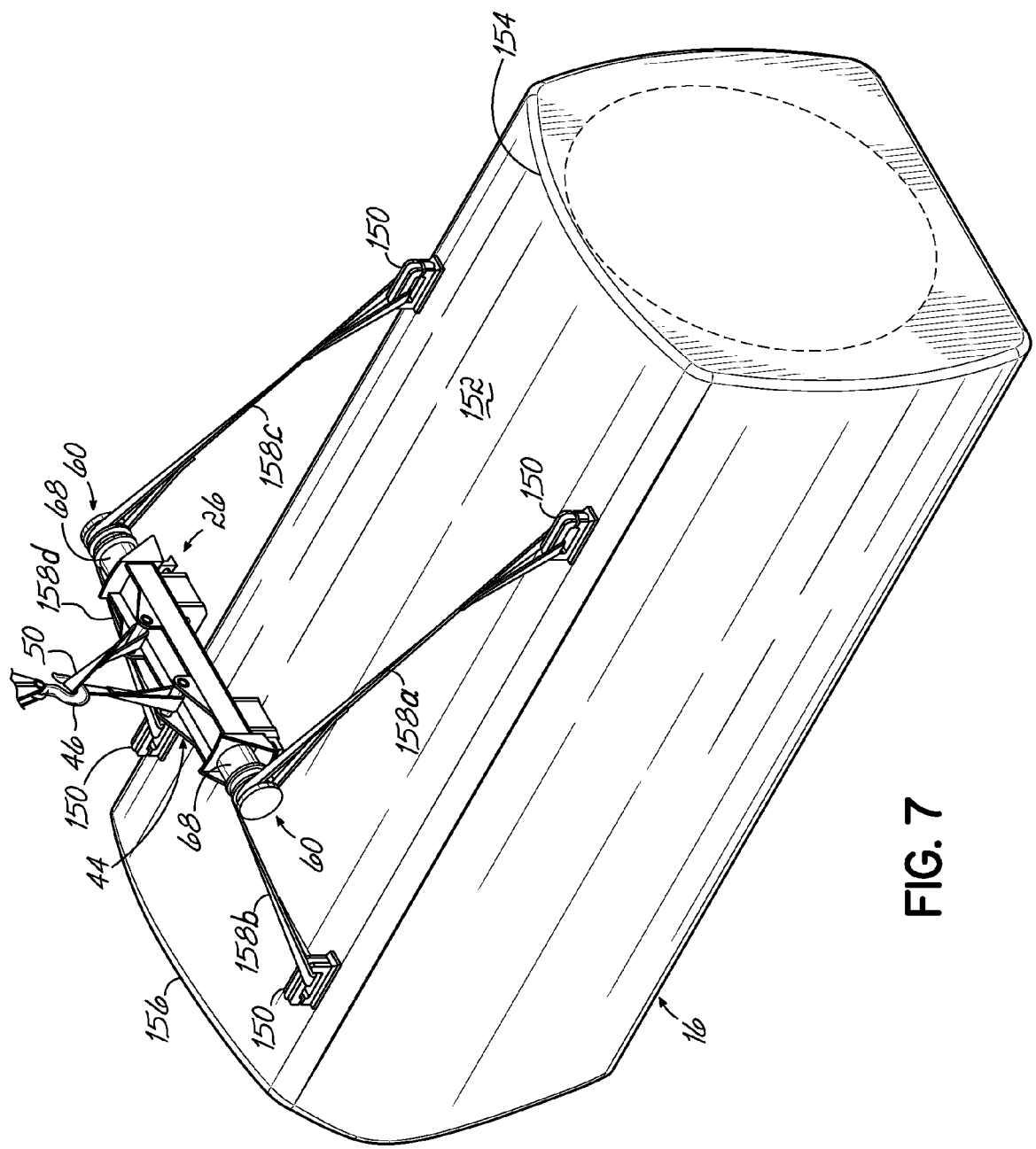
FIG. 7 is a perspective view of the connecting device coupled to a nacelle.

In this regard, and as illustrated in FIG. 7, the multi-functional connecting device 26 may also be used to handle nacelles 16, such as for loading, unloading and/or assembly purposes. In an exemplary embodiment, the coupling of the connecting device 26 to a nacelle 16 may be achieved via the second connection interface 60. To this end, the nacelle 16 typically includes a plurality of connectors 150, such as eyelets or the like, extending from an upper surface 152 of the nacelle 16. In one embodiment, the nacelle 16 may include two pairs of connectors 150, one pair adjacent a first end 154 of the nacelle 16, and another pair adjacent a second end 156 of the nacelle 16. The arrangement of the connectors 150 on the nacelle 16 is not limited to that shown, but may be arranged in a different manner, such as by including a third pair of connectors located along a central region of the nacelle 16 (not shown).

Suitable cables 158a-158d may extend from the connectors 150 on the nacelle 16 to the trunnions 68 of the connecting device 26. More particularly, each end of the cables 158a-158d may be positioned in corresponding grooves 72 defined by guide plates 70 to thereby limit the travel of the cables 158a-158d along the connecting device 26 and limit any significant interference between cables 158a-158d. When the cables 158a-158d are so coupled, the nacelle 16 may be moved by the hoisting device 48 to achieve the desired purpose, e.g., loading, unloading, or assembly. Once the nacelle 16 has been moved to its desired location, the cables 158a-158d may be removed from the nacelle 16 so as to load, unload, or assemble another nacelle 16, for example.

As noted above, the multi-functional connecting device 26 may be used to handle both the tower 14 and nacelle 16, i.e., the same connecting device 26 allows two different wind turbine sub-assemblies to be coupled to the hoisting device 48. In a further aspect of the invention, the connecting device 26 may also be used to handle blades 22 for loading, unloading, and/or assembly purposes. Depending on the particular task being performed, the connecting device 26 may be used in a slightly different manner. For example, the connecting device 26 may be coupled to a tower 14 and a nacelle 16 in a similar manner regardless of whether these sub-assemblies are being loaded onto a vessel, unloaded from a vessel, or assembled to form the wind turbine 10. This is not necessarily the case for the blades 22.

In this regard, the manner in which the connecting device 26 couples to the blades may differ depending on whether the blades are being loaded/unloaded, or being assembled to the wind turbine. In this regard, when the blades are being loaded or unloaded to/from a vessel, the connecting device 26 may be configured to couple to a blade lifting yoke, as described in more detail below. However, coupling of a blade 22 to the hub 20 of the wind turbine 10 during assembly is typically achieved using a blade gripping tool. Thus, during assembly of wind turbine 10, the connecting device 26 may be configured to couple to the blade gripping tool, as will be discussed in more detail below. Thus, in accordance with an aspect of the invention, the connecting device 26 may be configured to couple with the blade lifting yoke, for general loading or unloading of blades 22, or the blade gripping tool, for assembly of a blade 22 to a hub 20 of the wind turbine 10.

Figures 8, 9:
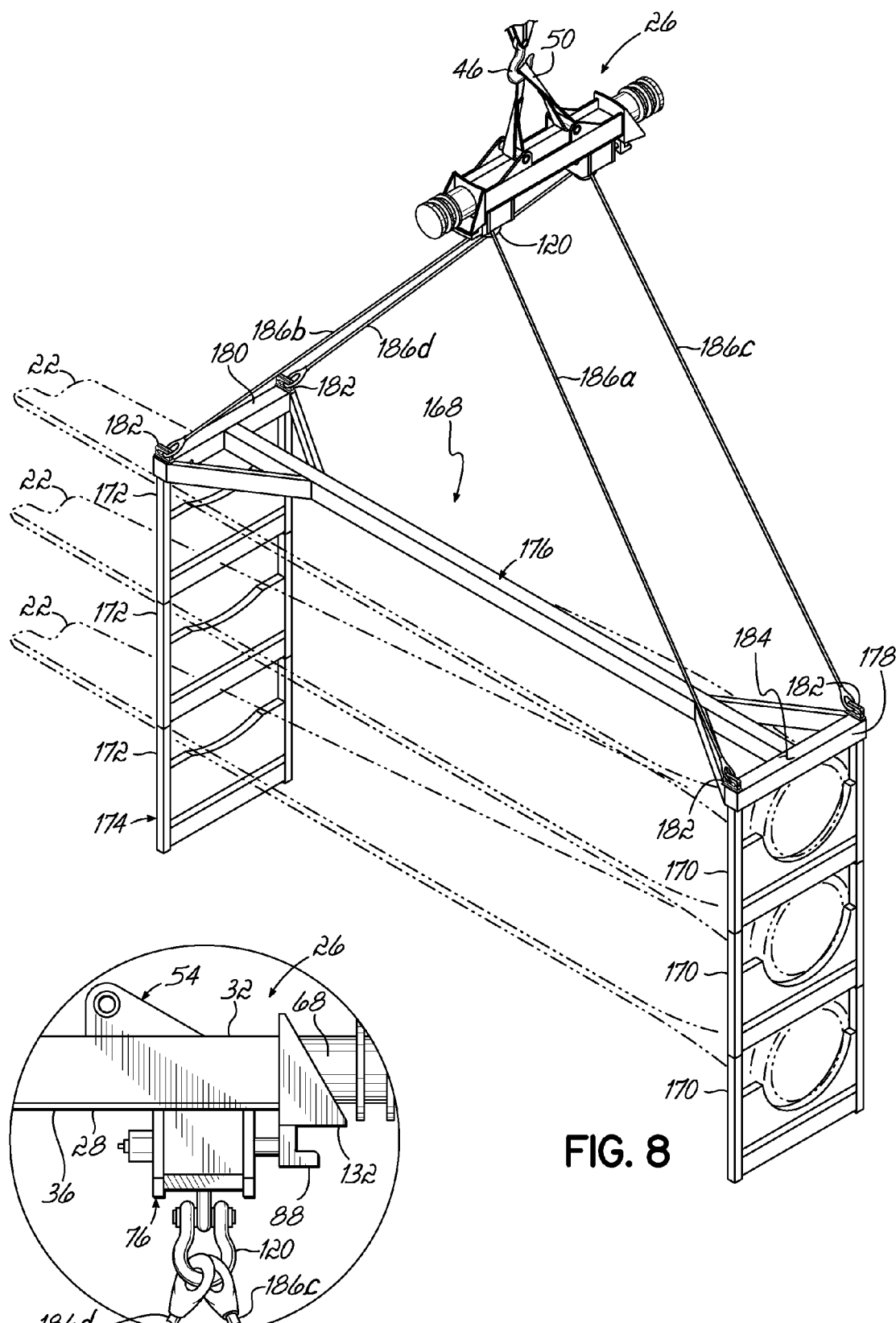
FIG. 8 is a perspective view of the connecting device coupled to a frame assembly carrying a plurality of wind turbine blades.
FIG. 9 is an enlarged view of the connecting device illustrating the coupling of a cable to the connecting device in accordance with one embodiment.

FIGS. 8 and 9 illustrate the use of the multi-functional connecting device 26 during a loading or unloading process for blades 22 (shown in phantom). In one embodiment, the connecting device 26 may be coupled to a blade lifting yoke, generally shown at 168, using suitable cables or the like for loading/unloading the blades 22. In this regard, the individual blades 22 may be loaded into respective frame members, including a root frame member 170 and a tip frame member 172. Once a plurality of blades 22 are loaded into respective frame members 170, 172, several blades 22 may be stacked one on top of the other to form a frame assembly 174. To form the frame assembly 174, adjacent frame members 170, 172 may be coupled through any suitable connector, including bolts or the like. In one embodiment, the blades 22 may be stacked in groups of three (as shown), but the number may vary depending on the particular application, and aspects of the invention should not be limited to the number shown.

The blade lifting yoke 168 generally includes a structural member that extends between the root and tip frame members 170, 172 and couples the (already coupled) root frame members 170 to the (already coupled) tip frame members 172. In one embodiment, the structural member may include a spreader bar 176, which is a beam-like member having a first end 178 which couples to the top most root frame member 170, and a second end 180, which couples to the top most tip frame member 172. The connection may be made through known methods, including bolting or the like. Spreader bars 176 are generally known in the art and thus will not be described in further detail herein. The spreader bar 176 may include a plurality of connectors 182, such as eyelets or the like, extending from an upper surface 184 of the spreader bar 176. In one embodiment, the spreader bar 176 may include two pairs of connectors 182, one pair of spaced apart connectors 182 adjacent the first end 178 of the spreader bar 176, and another pair of spaced apart connectors 182 adjacent the second end 180 of the spreader bar 176. The arrangement of the connectors 182 on the spreader bar 176 is not limited to that shown, but may be arranged in a different manner, including more or less connectors.

Suitable cables 186a-186d may extend from the connectors 182 on the spreader bar 176 to respective shackles 120 of the connecting device 26. For example, individual cables 186a-186d extend from the connectors 182 and couple to the shackles 120, as shown, for example, in FIG. 9. When the cables 186a-186d are so coupled, the blades 22 in the frame assembly 174 may be moved by the hoisting device 48 to load or unload the blades onto/from the vessel. Once the blades 22 have been moved to their desired location, the spreader bar 176 may be uncoupled from the frame assembly 174 so as to load or unload another group of blades 22 in similar frame assemblies, for example. While the spreader bar 176 is described above as being coupled to the shackles 120 via cables 186a-186d, in an alternative embodiment (not shown), the spreader bar 176 may be coupled to the trunnions 68 of the connecting device 26 using various cables, such as soft straps or the like.

Figure 10:
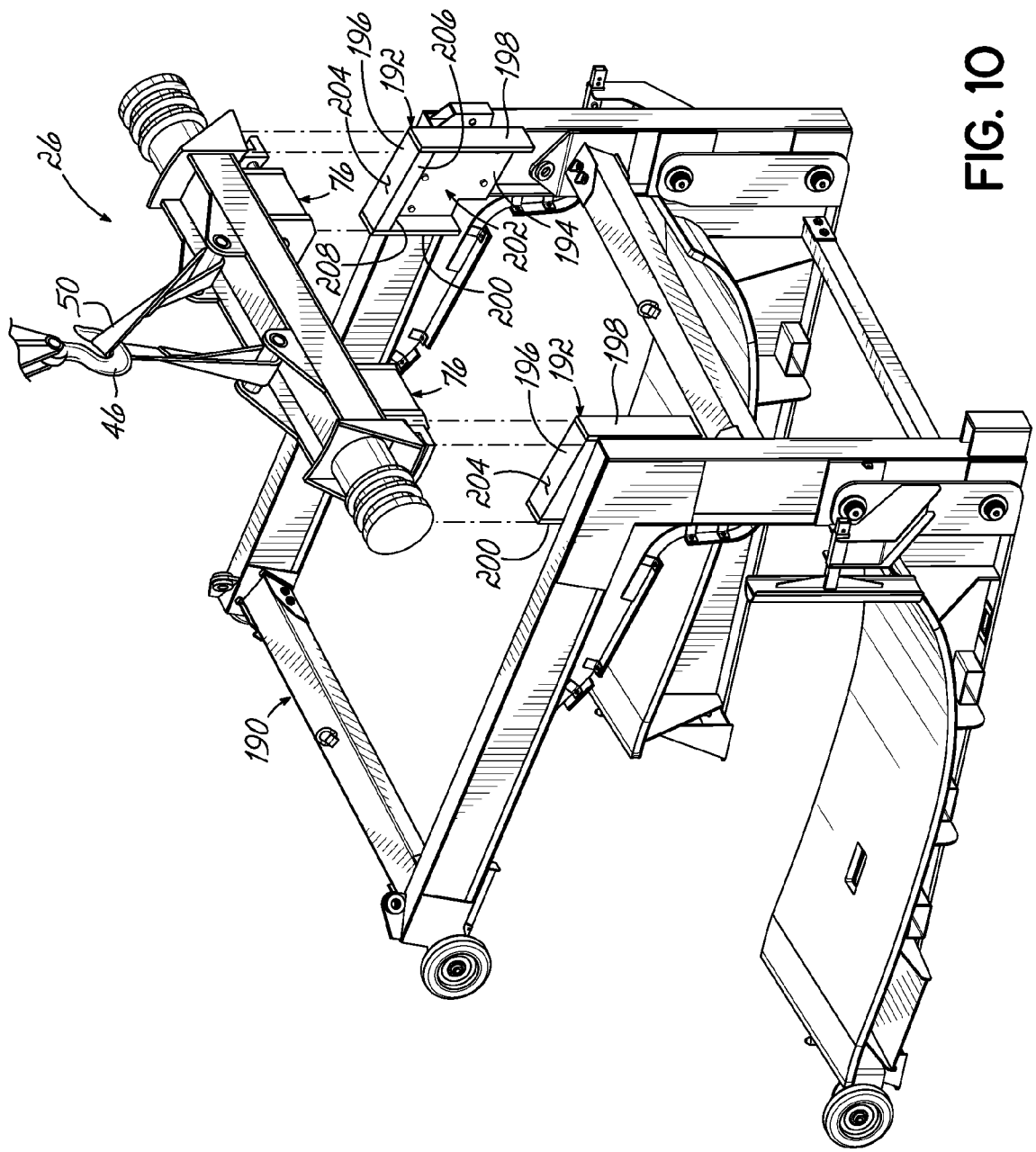
FIG. 10 is a perspective view of the connecting device coupled to a blade gripping tool.

As noted above, the multi-functional connecting device 26 may be configured to couple to a blade gripping tool during assembly of a blade 22 to the wind turbine 10. FIG. 10 shows a blade gripping tool 190 for coupling to a wind turbine blade 22 (not shown) during assembly of the blade 22 to the hub 20 of the wind turbine 10. The structure and method of using the blade gripping tool 190 is generally understood by one of ordinary skill in the art and thus will not be described in detail herein. Instead, the modifications to the blade gripping tool 190 that allows the connecting device 26 to couple thereto will be discussed. In one embodiment, the blade gripping tool 190 is configured to couple to the connecting device 26 via a fifth connection interface, which may, in an exemplary embodiment, be the third connection interface 76, i.e., via the retraction units 78. In this regard, the blade gripping tool 190 may include a pair of spaced-apart plate members 192 having a base wall 194, an upper wall 196, and spaced end walls, 198, 200. These walls, 194, 196, 198, 200 define a cavity 202 that is open at a lower end thereof and closed at an upper end thereof by upper wall 196. The cavity 202 is configured to receive the bearing plate 88 therein so as to couple the blade gripping tool 190 to the connection device 26.

In this regard, and similar to that described above for towers 14, the connecting device 26 may be placed on an end or surface of the blade gripping tool 190 such that the abutment plates 132 contact an upper surface 204 of the upper wall 196 of the plate members 192 to thereby support the connecting device 26. With the actuators 104 in a retracted position, the bearing plates 88 are positioned generally within a space or length between the plate members 192, so as to allow the connection device 26 to be seated on the blade gripping tool 190 without interference, and with the bearing plates 88 being positioned generally below the upper wall 196 of plate members 192. With the connecting device 26 and bearing plates 88 so positioned, the actuators 104 may be actuated so as to move the bearing plates 88 outwardly to the extended position and within the cavity 202. This may be done, for example, using the controller 116 or other device for actuating the actuators 104.

In the extended position, the base portion 94 may abut the inner edge 206 of the upper wall 196 and the lip portion 96 may underlie the upper wall 196. For example, an upper surface 138 of the bearing plates 88 may engage the underside surface 208 of the upper wall 196. In this position, the connecting device 26 is essentially locked onto the blade gripping tool 190 and the connecting device 26 is substantially prevented from moving relative thereto. In this regard, the end walls 198, 200 prevent the blade gripping tool 190 from moving relative to the connection device 26 in, for example, horizontal or lateral directions. In this way, the blade gripping tool 190 may be moved by the hoisting device 48 to achieve the desired purpose, e.g., assembly of a blade 22 to the hub 20 of the wind turbine 10. Once the blade 22 is assembled to the hub 20, the blade gripping tool 190 may be used to install another blade 22. When the blades 22 are installed, the connecting device 26 may be uncoupled from the blade gripping tool 190. In this regard, the actuators 104 may be actuated so as to move the bearing plates 88 back to the retracted position. The connection device 26 may then be lifted off the blade gripping tool 190 by the hoisting device 48.

In one embodiment, the plate members 192 may be integrally formed into the design of the blade gripping tool 190. In an alternative embodiment, however, the plate members 192 may be configured as separate elements which are then selectively attached to the blade gripping tool 190 to allow the multi-functional connecting device 26 to couple thereto. In this regard, the plate members 192 may operate as a retrofit to existing blade gripping tools to provide a connection to the multi-functional connecting device 26. It should be recognized that the plate members 192 may be located on the blade gripping tool 190 at other suitable locations and in a manner that facilitates coupling to the connecting device 26.

Aspects of the present invention provide certain benefits to wind turbine manufacturers and others that transport and/or assemble wind turbines. In one aspect, various wind turbine sub-assemblies may be assembled quay side and then be loaded onto a vessel for transport to an off-shore wind turbine installation site. A hoisting device is used to load the sub-assemblies onto the vessel. In one aspect of the invention, the multi-function connecting device allows multiple sub-assemblies to be coupled to the hoisting device without the need for a separate, dedicated interface for each of the sub-assemblies. The multi-use capability of the connecting device reduces or avoids the time, effort and safety concerns associated with change-out procedures. Similar advantages apply to the unloading of sub-assemblies at the installation site or the assembly of the wind turbine at the installation site, as fully explained herein.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative methods, and illustrative examples shown and described. Accordingly, departures may be made from such details without departing from the spirit or scope of the general inventive concept.

What is claimed is:

1. A method for handling wind turbine sub-assemblies, comprising:
    coupling a connecting device to a connector of a hoisting device at a first connection interface of the connecting device;
    coupling a first wind turbine sub-assembly to the connecting device at a second connection interface of the connecting device;
    moving the first wind turbine sub-assembly with the hoisting device;
    coupling a second wind turbine sub-assembly different than the first wind turbine sub-assembly to the connection device at a third connection interface of the connecting device; and
    moving the second wind turbine sub-assembly with the hoisting device,
    wherein the first wind turbine sub-assembly includes a nacelle, wherein the connecting device includes trunnions at spaced-apart locations thereon, and wherein the step of coupling the first wind turbine sub-assembly to the connecting device at the second connection interface further comprises:
    extending cables from the trunnions of the connecting device to connectors on the nacelle; and
    limiting movement of the cables along the trunnions.

2. The method according to claim 1, wherein limiting movement of the cables along the trunnions further comprises locating the cables in channels on the trunnions having side walls that bound the cables.

3. A method for handling wind turbine sub-assemblies, comprising:
    coupling a connecting device to a connector of a hoisting device at a first connection interface of the connecting device;
    coupling a first wind turbine sub-assembly to the connecting device at a second connection interface of the connecting device;
    moving the first wind turbine sub-assembly with the hoisting device;
    coupling a second wind turbine sub-assembly different than the first wind turbine sub-assembly to the connection device at a third connection interface of the connecting device; and moving the second wind turbine sub-assembly with the hoisting device, wherein the second wind turbine sub-assembly includes a tower, wherein the third connection interface includes a movable element movable between a first position and a second position, the connecting device being coupled to second sub-assembly when the movable element is in the first position and the connecting device being uncoupled from the second sub-assembly when the movable element is in the second position, and wherein the step of coupling the second wind turbine sub-assembly to the connecting device at the third connection interface further comprises:

positioning the movable element in the second position;
positioning the connecting device on an end of the tower; and
positioning the movable element in the first position so as to couple the tower to the connecting device.

4. The method according to claim 3, wherein positioning the movable element in the first or second position further comprises actuating an actuator to move the movable member to the first or second position.

5. The method according to claim 3, wherein the tower includes an inwardly directed flange adjacent the end of the tower, the method further comprising:

positioning the connecting device on the end of the tower such that the movable element is within a periphery defined by the flange and positioned below the flange; and
positioning the movable element in the first position by moving the movable element outward of the periphery of the flange so as to be beneath the flange.

6. A method for handling wind turbine sub-assemblies, comprising:

coupling a connecting device to a connector of a hoisting device at a first connection interface of the connecting device;
coupling a first wind turbine sub-assembly to the connecting device at a second connection interface of the connecting device;
moving the first wind turbine sub-assembly with the hoisting device;
coupling a second wind turbine sub-assembly different than the first wind turbine sub-assembly to the connection device at a third connection interface of the connecting device; and
moving the second wind turbine sub-assembly with the hoisting device;
coupling a third wind turbine sub-assembly different than the first and second sub-assemblies to the connecting device at a fourth connection interface of the connecting device; and
moving the third wind turbine sub-assembly with the hoisting device.

7. The method according to claim 6, wherein the third wind turbine sub-assembly includes a frame assembly carrying a plurality of blades, the method comprising coupling the connecting device to the frame assembly using a blade lifting yoke.

8. The method according to claim 7, wherein the connecting device includes one or more shackles located thereon, and wherein the step of coupling the third wind turbine sub-assembly to the connecting device at the fourth connection interface further comprises:

coupling a structural member of the blade lifting yoke to the frame assembly; and extending cables from the shackles of the connecting device to the structural member of the blade lifting yoke.

9. The method according claim 6, wherein the third wind turbine sub-assembly includes a frame assembly carrying a plurality of blades, the formation of the third wind turbine sub-assembly further comprising:

coupling a root frame member to each blade adjacent a root end of the blade;
coupling a tip frame member to each blade adjacent a tip end of the blade;
stacking one blade on top of another blade; and
coupling adjacent root and tip frame members to form the frame assembly holding the plurality of blades.

10. The method according to claim 6, further comprising:

coupling a fourth wind turbine sub-assembly different than the first, second, and third sub-assemblies to the connecting device at a fifth connection interface; and
moving the fourth wind turbine sub-assembly with the hoisting device.

11. The method according to claim 10, wherein the fourth wind turbine sub-assembly includes a single blade, the method comprising coupling the connecting device to the blade using a blade gripping tool.

12. The method according to claim 11, further comprising coupling selectively removable plate members to the blade gripping tool prior to coupling the connecting device thereto.

13. The method according to claim 11, wherein the fifth connection interface includes a movable element movable between a first position and a second position, the connecting device being coupled to fourth sub-assembly when the movable element is in the first position and the connecting device being uncoupled from the fourth sub-assembly when the movable element is in the second position, and wherein the step of coupling the fourth wind turbine sub-assembly to the connecting device at the fifth connection interface further comprises:

positioning the movable element in the second position;
positioning the connecting device on a surface of the blade gripping tool; and
positioning the movable element in the first position so as to couple the blade gripping tool to the connecting device.

14. An apparatus for handling wind turbine sub-assemblies, comprising:

an elongate main body member;
a first connection interface coupled to the main body member and configured for coupling the apparatus to a connector of a hoisting device;
a second connection interface coupled to the main body member and configured for coupling the apparatus to a first wind turbine sub-assembly; and
a third connection interface different than the second connection interface and configured for coupling the apparatus to a second wind turbine sub-assembly different than the first wind turbine sub-assembly,
wherein the first wind turbine sub-assembly includes a nacelle and the second connection interface includes trunnions at opposed ends of the main body member.

15. The apparatus of claim 14, wherein the second wind turbine sub-assembly includes a tower and the third connection interface includes a movable element movable between a first position and a second position, the apparatus being coupled to the tower when the movable element is in the first position and the apparatus being uncoupled from the tower when the movable element is in the second position.

16. An apparatus for handling wind turbine sub-assemblies, comprising:

an elongate main body member;
a first connection interface coupled to the main body member and configured for coupling the apparatus to a connector of a hoisting device;
a second connection interface coupled to the main body member and configured for coupling the apparatus to a first wind turbine sub-assembly;
a third connection interface different than the second connection interface and configured for coupling the apparatus to a second wind turbine sub-assembly different than the first wind turbine sub-assembly; and
a fourth connection interface different than the second and third connection interfaces coupled to the main body member and configured for coupling the apparatus to a third wind turbine sub-assembly different than the first and second wind turbine sub-assemblies.

17. The apparatus of claim 16, wherein the third wind turbine sub-assembly includes a frame assembly carrying a plurality of blades and the fourth connection interface includes at least one shackle.

\* \* \* \* \*